United States Patent [19]

Cottrell

[11] Patent Number: 4,836,387

[45] Date of Patent: Jun. 6, 1989

[54] DEFLECTION GATE DRIVEN BY STEPPER MOTOR

[75] Inventor: Ronald A. Cottrell, Portsmouth, England

[73] Assignee: De La Rue Systems, Limited, England

[21] Appl. No.: 889,425

[22] Filed: Jul. 23, 1986

[30] Foreign Application Priority Data

Jul. 24, 1985 [GB] United Kingdom ................. 8518703

[51] Int. Cl.[4] ........................... B07C 5/36; H02P 8/00

[52] U.S. Cl. ..................................... 209/657; 318/696

[58] Field of Search ................. 209/656, 657; 318/696

[56] References Cited

U.S. PATENT DOCUMENTS

| | | | |
|---|---|---|---|
| 3,660,747 | 5/1972 | Kruer et al. | 318/696 |
| 3,674,143 | 7/1972 | Hunter et al. | 209/657 X |
| 3,755,727 | 8/1973 | Schifalacqua | 318/696 |
| 3,824,440 | 7/1974 | McIntosh | 318/696 |
| 3,976,290 | 8/1976 | Wallace . | |
| 4,063,142 | 12/1977 | Sieber et al. . | |
| 4,251,000 | 2/1981 | Templeton | 209/657 X |
| 4,362,981 | 12/1982 | Arai | 318/696 |
| 4,434,392 | 2/1984 | Brasseur | 318/696 |
| 4,450,517 | 5/1984 | Sundstrom | 318/696 X |
| 4,634,948 | 1/1987 | Brigham | 318/696 |

FOREIGN PATENT DOCUMENTS 2056852 5/1972 Fed. Rep. of Germany .

OTHER PUBLICATIONS

*Theory and Application of Step Motors*, Benjamin C. Kuo, West Publishing Co., 1974; Chapter 10, *Permanent Magnet Step Motors*, T. E. Beling, Sigma Instruments, Inc., Braintree, Mass.

*Primary Examiner*—James B. Marbert
*Assistant Examiner*—Edward M. Wacyra
*Attorney, Agent, or Firm*—Ostrolenk, Faber, Gerb & Soffen

[57] ABSTRACT

Apparatus for sorting articles and comprising a deflector movable between first and second positions to ensure that an arriving article will follow one of two paths, a stepping motor (20), the shaft of which is coupled to the deflector (21), and end stops (17, 18) limiting the angular movement of the stepping motor shaft to an angular interval between first (12) and second (13) angular positions corresponding to the first and second positions of the deflector. The angular interval between the first and second angular positions of the stepping motor shaft is less than and lies within the angular interval defined by a shaft position (10) of stable equilibrium in the first direction of energization of the stepping motor windings and an adjacent shaft position (11) of stable equilibrium in the second direction of energization of the stepping motor windings. In the preferred arrangement, the motor has two windings connected in parallel between the mid-points of two transistors each of which comprises two series-connected transistors (22, 23 and 24, 25) the gates of which are energized to cause current flow through the windings in one direction for a first direction of movement of the deflector and in the other direction for the opposite direction of deflector movement.

4 Claims, 3 Drawing Sheets

DEFLECTION GATE DRIVEN BY STEPPER MOTOR

BACKGROUND AND SUMMARY OF THE INVENTION

Apparatus for sorting articles normally comprises a deflecting device to cause a moving article to follow one of two paths, the deflecting device being appropriately positioned during the intervals between the arrival of the articles. The deflector may be operated by a solenoid.

Sorting apparatus according to the present invention comprises a deflector movable between first and second positions and located in a path of movement of the articles to be sorted, the position of the deflector ensuring that each article will follow one of two paths; and means for positioning the deflector, the positioning means being characterised by: a stepping motor; a circuit for energising the stepping motor for angular movement in a first direction or in a second opposite direction; means limiting the angular movement of the stepping motor shaft to a first angular position in one direction and a second angular position in the other direction, the angular interval between the first and second angular positions being less than and lying within the angular interval defined by a shaft position of stable equilibrium in the first direction of energisation of the stepping motor windings and an adjacent shaft position of stable equilibrium in the second direction of energisation of the stepping motor windings; and the shaft of the stepping motor being coupled to the deflector such that the deflector is in its first and second positions when the stepping motor shaft is in its first and second angular positions, respectively.

In the preferred form of driving circuit for the stepping motor used in the apparatus according to the invention, the motor has two windings whch are connected in parallel between two transistor circuits, each of which comprises two series-connected transistors of opposite conductivity types with their gates connected together. A control circuit receives a binary signal representing the required direction of rotation and provides two output signals of opposite logic levels. The gates of the two transistor circuits receive the signals of opposite logic levels so that for one state of the gate signals current flows through the two windings in a first direction and for the other state of the gate signals (in which the logic levels are reversed) current flows through the two windings in the opposite direction.

BRIEF DESCRIPTION OF THE DRAWINGS

In order that the invention may be better understood, an example of apparatus embodying the invention will now be described with reference to the accompanying drawings. In the drawings.

DETAILED DESCRIPTION OF THE PREFERRED EMBODIMENT

Figure 1:
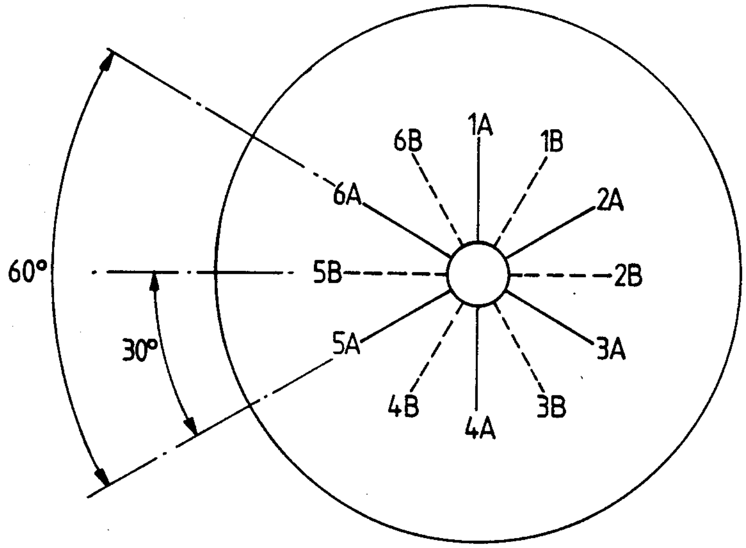
FIG. 1 illustrates the positions of stable equilibrium of a two-phase stepping motor with a 15° step.

The rotor of the two-phase stepping motor has a number of positions of stable equilibrium (zero torque) as the shaft is rotated through a revolution in response to the energisation of both windings. The positions of stable equilibrium are at intervals of 4n°, where n is the step angle of the motor. When the direction of energisation of both windings is reversed, the positions of equilibrium shift by 2n°. This is shown in FIG. 1 of the drawings, in which the circle represents the stepping motor, the radial lines 1A to 6A represent the positions of stable equilibrium when the windings are energised in a first direction A, and the dotted radial lines 1B to 6B represent the positions of stable equilibrium when the windings are energised in the opposite direction B. Thus, for the motor illustrated, having a step angle of 15° the angular interval between successive positions of stable equilibrium in either of the two directions of winding energisation is 60° while the interval between a stable equilibrium position for one direction and the adjacent stable equilibrium position for the other direction is 30°.

Figure 2:
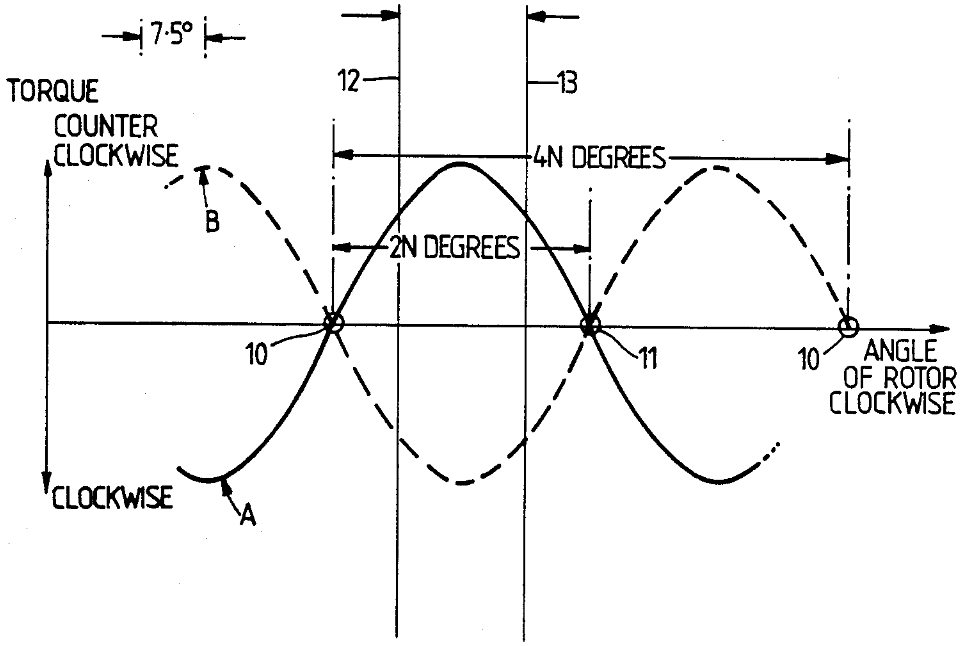
FIG. 2 shows approximate torque curves for the stepping motor and indicates end stop positions for a deflector actuator.

FIG. 2 of the drawings is a diagram showing the variation of torque, clockwise and counterclockwise, with the angle of the rotor over a small range of the rotor angle. The solid line curve shows the torque variation for the first direction A of winding energisation and the dotted line curve shows the torque variation for the second direction B of winding energisation. Point 10, where both curves cross the zero-torque line, is a point of stable equilibrium for curve A and a point of unstable equilibrium for curve B. Point 11 (spaced from point 10 by 2n°) is a point of unstable equilibrium on curve A and a point of stable equilibrium on curve B.

Figure 3:
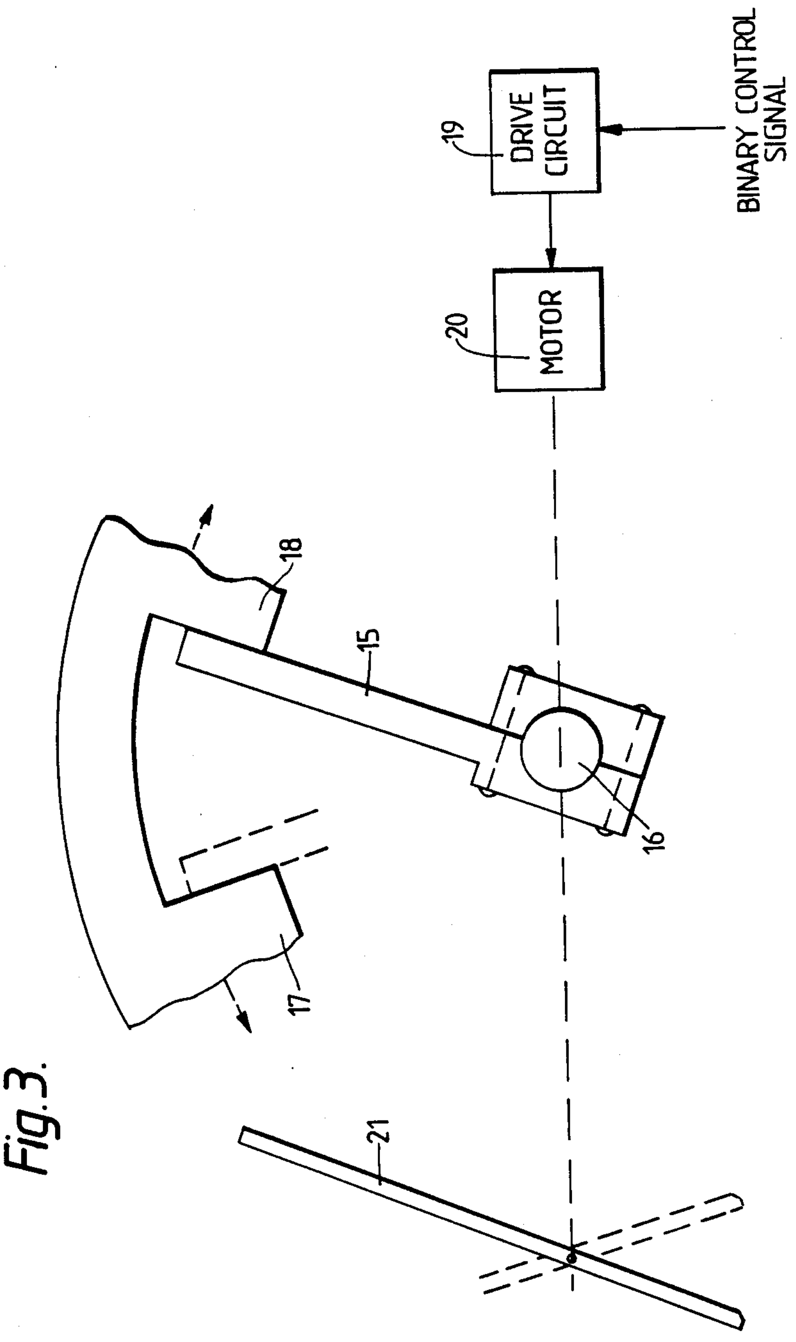
FIG. 3 shows diagrammatically the actuator and its end stops.

As shown in FIG. 3, an anvil or actuator 15 is connected to a shaft 16 coupled to the rotor of the stepping motor 20 and is angularly movable between end stops 17 and 18. The deflector 21 is fixed to the same shaft 16 and moves with the anvil 15. The driving means 19 for the motor is energised by a binary control signal. In FIG. 2, the lines 12 and 13 represent the limits of the end stops for the actuator. It will be seen that these are spaced by an angle which is less than 2n°(30°) and defines an angular range which is within the angular range defined by points 10 and 11.

Figure 4:
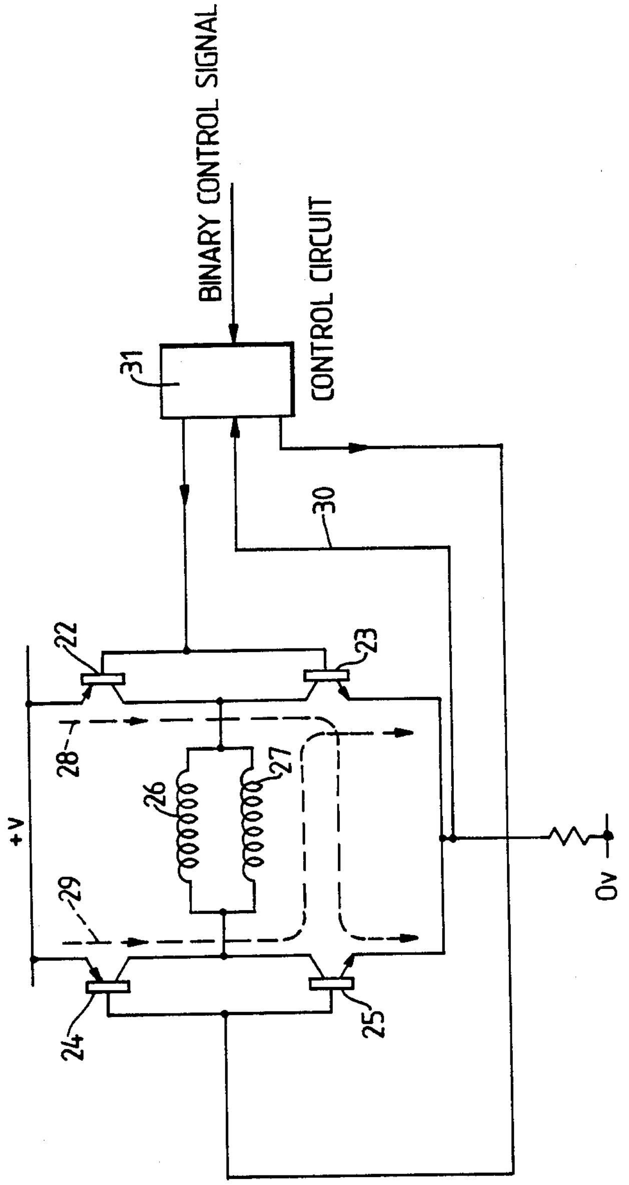
FIG. 4 shows the circuit for energising the stepping motor windings.

As shown in FIG. 4, the binary control signal is applied to a control circuit 31 including an input buffer (not shown) and providing two output signals which are applied to the driving circuit, comprising four transistors 22, 23, 24 and 25. A first output is connected to the gate of each of the transistors 22 and 23 and the second output is connected to the gate of each of the transistors 24 and 25. The transistors 22 and 24 are of the pnp type and the transistors 23 and 25 are of the npn type. Consequently, in one condition of the input buffer for which a first of its outputs is at the logic one level and the second of its outputs is at the logic zero level, transistors 22 and 25 will conduct. When the output states of the input buffer are reversed, transistors 23 and 24 will conduct. It will be seen that for one output state of the buffer circuit, current flows along a path 28 through transistor 22, through the two parallel-connected motor windings 26 and 27 in a first direction, and through transistor 25. For the other of the output states of the buffer circuit, current flows along a path 29 through transistor 24, then through the two windings in the opposite direction, and finally through transistor 25. Thus, the state of the binary control signal is used to control the direction of current flow through the windings. It will be seen from FIG. 2 that the direction of current flow through the windings controls the direction of movement of the stepping motor and its actuator.

When the windings are energised in one direction, the motor will exert a torque which will force the actuator against one of the end stops; when the windings are energised in the opposite direction, the motor will exert a torque which will force the actuator against the other of the end stops. Thus, the stepping motor is rotated to a stable position against one of the two fixed end stops by the application of a binary signal to a simple drive circuit without complex step and direction circuits and with only one stable position of the motor shaft for each state of the binary control signal. The stepping motor system described thus gives bidirectional operation without requiring a spring return. FIG. 4 also shows an optional connection 30 allowing current sensing for chopper control.

A suitable stepping motor for use in this application is the Impex ID36 9904-112-36114, made by Philips.

The arrangement shown has the advantage that a single stepping motor can be used to cause a deflector to divert articles into either of the output paths; in apparatus using solenoid-operated deflectors, we previously used two solenoids, one to pull the deflector in each direction. The stepping motor has good reliability and long life and the driving circuits required are inexpensive and simple. Control is effected by a single binary signal and the response is fast (typically 15 ms).

The apparatus can be used, for example in a banknote sorter.

I claim:

1. Sorting apparatus comprising a deflector movable between first and second positions and located in a path of movement of the articles to be sorted, the position of the deflector ensuring that each article will follow one of two paths; and means for positioning the deflector, the positioning means including:

a stepping motor having two windings which are connected in parallel between two transistor circuits, each of which comprises two series-connected transistors;

a circuit for energising the stepping motor for angular movement in a first direction or in a second opposite direction;

means limiting the angular movement of the stepping motor shaft to a first angular position in one direction and a second angular position in the other direction, the angular interval between the first and second angular positions being less than and lying within the angular interval defined by a shaft position of stable equilibrium in the first direction of energisation of the stepping motor windings and an immediately adjacent shaft position of stable equilibrium in the second direction of energisation of the stepping motor windings; and means coupling the shaft of the stepping motor to the deflector such that the deflector is in its first and second positions when the stepping motor shaft is in its first and second angular positions, respectively; and wherein the control circuit is connected to receive a binary signal representing the required direction of rotation of the stepping motor and providing two output signals of opposite logic levels, the conductivity types of the transistors and the connections from the outputs of the control circuit to the transistor gates being such that when said binary signal is at a first logic level current flows through the two windings in a first direction and when said binary signal is at a second logic level current flows through the two windings in the opposite direction.

2. Sorting apparatus according to claim 1, in which in each transistor circuit the two series-connected transistors are of opposite conductivity types with their gates connected together, the two interconnected pairs of gates being connected respectively to the first and second outputs of the control circuit.

3. Sorting apparatus according to claim 1, wherein said stepping motor has only two windings.

4. Sorting apparatus comprising a deflector movable between first and second positions and located in a path of movement of the articles to be sorted, the position of the deflector ensuring that each article will follow one or two paths; and means for positioning the deflector, the positioning means including:

a stepping motor having first and second windings;

a circuit for selectively energizing either the first winding of the stepping motor for angular movement in a first direction or the second winding of the stepping motor for angular movement in a second opposite direction;

means limiting the angular movement of the stepping motor shaft to a first angular position in one direction and a second angular position in the other direction, the angular interval between the first and second angular positions being less than and lying within the angular interval defined by a shaft position of stable equilibrium in the first direction of energisation of the stepping motor windings and an immediately adjacent shaft position of stable equilibrium in the second direction of energisation of the stepping motor windings; and means coupling the shaft of the stepping motor to the deflector such that the deflector is in its first and second positions when the stepping motor shaft is in its first and second angular positions, respectively.

* * * * *